Figure 1:
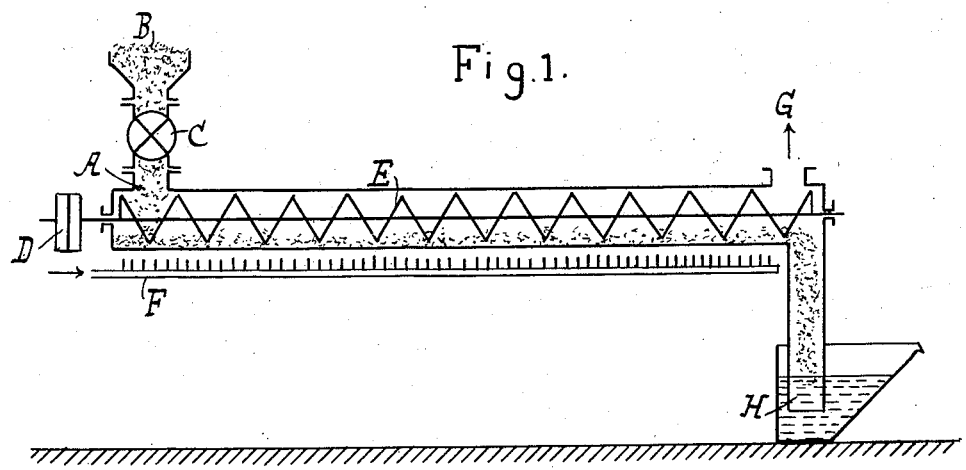

Sept. 19, 1933.   M. PIER ET AL   1,927,244

DISTILLATION OF HYDROGENATED OIL RESIDUES

Filed March 27, 1928

Mathias Pier
Karl Winkler
Wilhelm Michael
INVENTORS

BY *Hauff bell Varland*
ATTORNEYS

Patented Sept. 19, 1933

1,927,244

UNITED STATES PATENT OFFICE 1,927,244

DISTILLATION OF HYDROGENATED OIL RESIDUES

Mathias Pier, Heidelberg, and Karl Winkler and Wilhelm Michael, Ludwigshafen - on - the - Rhine, Germany, assignors, by mesne assignments, to Standard-I. G. Company, Linden, N. J., a corporation of Delaware Application March 27, 1928, Serial No. 265,219, and in Germany March 31, 1927

2 Claims. (Cl. 202—15)

In the production of valuable liquid and other hydrocarbons and derivatives thereof such as light, middle and heavy oils from various kinds of coal, tars and other solid, semi-solid or liquid carbonaceous materials by treatment with added hydrogen or gases furnishing it, which are equivalents for the purpose of the present invention, under pressure and preferably in the presence of catalysts the valuable liquid products are accompanied by residues of from solid to semi-solid consistency which contain oil in particular heavy oils in admixture with solid matter and which require extensive treatment of a suitable kind in order to ensure a maximum degree of economy. By the heat treatment of hydrocarbon products in the presence of hydrogen and under pressure these products are attacked with the formation of very minute solid particles insoluble in the oil which are finely dispersed therein and which, by reason of their surface action, retain considerable quantities of oil extremely firmly, and in this manner a very viscous mass is formed which first becomes soft or liquid at considerably elevated temperatures. This condition renders the further working up extremely difficult.

We have now found that a very favorable method of treatment consists in carefully heating said oil-bearing residues, preferably immediately in succession to the process of destructive hydrogenation, thereby utilizing the heat contained in the products. The formation of coke from the oily constituents of the said residues must be reduced to a minimum. The operation is preferably accompanied by the admission of hot non-oxidizing gases or vapors, especially steam, in which case higher working temperatures may be employed, than in the absence of these gases or vapors. As such gases or vapors, if desired in addition to steam, also hydrocarbons, such as methane, benzine and the like, may be employed, which, however, must be used at temperatures below their decomposition points. When such additions are used, other means of heating such as external heating may be employed simultaneously. This treatment may be preceded by centrifuging, pressing or filtering at ordinary or elevated temperature.

The process may be carried out in various ways, as for example in a shaft furnace, rotary furnace, low-temperature producer, metal bath, on revolving belts or discs, and the like.

When carrying out the process it may sometimes be advisable to add substances which act as absorbents, distributors, or catalysts, so that the treatment of the residues is facilitated and oils of improved quality are recovered. As examples of such additions may be mentioned fillers of active charcoal, brown coal, coke, clay, alumina, sand and heavy metal oxides, in particular of metals of groups 6 to 8 of the periodic system.

The gases or vapors above referred to, as for example steam, are passed over or through the material under treatment, at suitable velocity. The material is passed, for example, in shallow layers over spiral surfaces, a favorable method of carrying out the process being to convey the oil-bearing material through a closed pipe, by means of a worm, and to pass a current of hot gas or vapor through the pipe in the same or opposite direction. In this way a large amount of material may be dealt with, and completely freed from oil. A stationary worm and a revolving pipe may also be used, or both worm and pipe may be rotated in the same or opposite direction. The product to be freed from oil may be fed by means of a worm, in which process a large proportion of the oil is removed by the current of hot gases. The oily residues and gases or vapors may also be atomized in a heated chamber, an arrangement which increases the action of the gases or vapors. In this case, the solids are deposited in a dry and finely divided state, and may be removed by means of worms and the like. The atomizing may be effected by means of nozzles of any desired form.

An effect similar to that of the said gases or vapors may also be obtained by the aid of a vacuum; or, according to the character of the materials under treatment, it may also be advisable to employ raised pressures in order to retard the formation of gas and obtain higher yields of liquid. At the same time, atomization, for example with water, may be effected. It is also frequently advisable to raise the temperature by stages, and to remove the resulting products at different points. When steam is used, it is preferable to separate the water from the oil while still warm.

The separated oils, or fractions of the same, may be employed for producing suspensions or pastes with solid substances—especially coal and the like—to be destructively hydrogenated. When suitably low temperatures are employed, the whole of the oils can be recovered in an unaltered condition, chiefly in the form of heavy oils, suitable for making such pastes. Any other mineral oils or tars however may also be used for making the pastes with coal. The working temperatures may also be so chosen that a portion of the oil is cracked, by which means middle oils, suitable for the production of benzine, are obtained. The temperatures may also be so high that valuable gases,—and more especially those of olefine type such as propylene, ethylene or butylene, are produced, which can be subjected to further treatment in various ways as for example for the production of higher alcohols, solvents, lubricating oils and the like.

The process may also be carried out in a continuous cycle, with regeneration of heat.

It is advisable to avoid using, in the hot portions of the apparatus, any substances liable to give rise to the formation of gas, such as methane, or to carbon deposits at the working temperature employed, particularly when operating on the cycle principle.

When freed from oil, the residues may be gasified or burned, the hot gases being used, if required with admixtures of other gases or vapors, as agents for the treatment of fresh residues, the heat contained in them thus being utilized.

The oily residues, which may be hot, can be fed, for example to a producer. A portion of the carbonaceous residue, freed from oil, is gasified in the lower zone, and the ascending hot gases expel the oil from the upper layers. By operating in this manner, a valuable producer or Dowson gas is obtained in addition to the liquid hydrocarbons. The mist of tar and oil may be separated from the gases by any known or suitable methods, such as washing with mineral oil or other liquid organic solvents, or by means of solid adsorbents, or by electrical precipitation and the like.

The residues freed from oil may also be subjected to dry distillation at temperatures of from 800° to 1000° centigrade, a gas resembling coal gas being obtained, and the degasified products afterwards converted into power or water gas in a producer.

The condition in which the de-oiled residues are obtained, varies according to the kind of substance treated. For example, the degasification and gasification become less important when, as the result of effective degradation of the initial material, the bulk of the carbon is converted into liquid products during the destructive hydrogenation.

The de-oiled residues may also find application as active carbon as for example decolorizing carbon in catalytic and adsorptive processes, either directly or after further treatment. A valuable active carbon is obtained, in particular, when the heating is conducted in the present of catalytic substances, such as metallic salts, especially those of the metals of groups 6 to 8 of the periodic system. The said active carbon exhibits a considerably larger inner surface than the species of active carbon hitherto prepared, this being apparently due to the fact that by the hydrogenation under pressure a considerable portion of the coal or other carbonaceous materials is converted into lower boiling oils and is so to speak dissolved out, and that the remaining unconverted matter constitutes a rather voluminous mass. The de-oiled residues may also be advantageously subjected to treatment with hydrogen, with or without the application of pressure, the products then obtained consisting of gaseous, liquid or solid hydrocarbons according to the working conditions employed.

The de-oiled products may also serve as fuel for use in pulverulent fuel engines, either directly or after further treatment.

In the accompanying drawing modifications of the apparatus, in which the process according to the present invention can be carried out, are illustrated in vertical cross-section, but it should be understood that the invention is not limited to working in the particular forms of the apparatus illustrated.

Referring first to Figure 1, B is a hopper. C is a wheel for turning the materials to be introduced into the deoiling vessel. F is a heating device capable of the production of zones of increasing temperature in the direction of its length. D is a driving wheel and E is a worm conveyor. G is an opening for the removal of gaseous and vaporous distillation products and H is an opening for the removal of the deoiled residues.

In working with the said apparatus the materials to be deoiled are introduced into the distillation vessel from the hopper B by means of the wheel C at A. The worm conveyor E is maintained in motion by means of the driving wheel D and the vessel is heated by the heating device F, the temperature increasing in the direction in which the residues are moved by the worm conveyor. The vapours of oil are removed at G and the deoiled residues fall down into the bath H, in which they are quenched.

Figure 2:
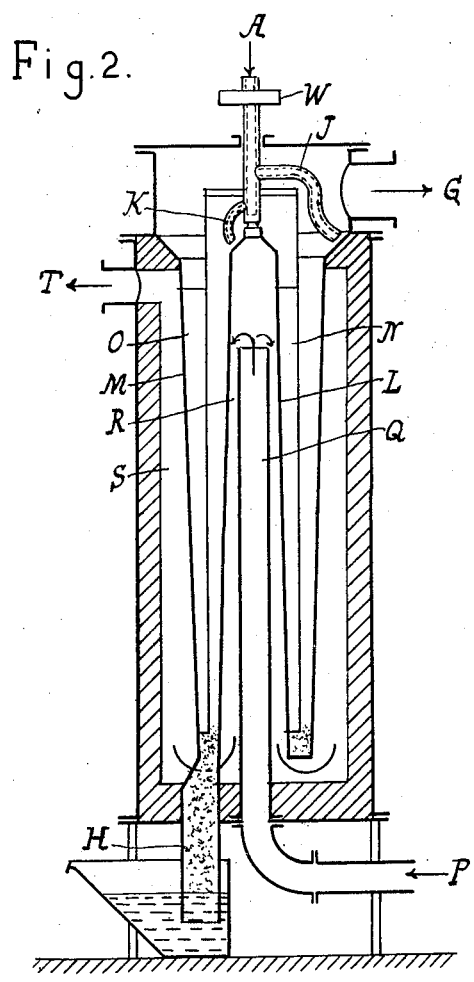

A further modification of the apparatus is shown in Figure 2. A is a hollow rotary distributing device having branch pipes J and K for the introduction of residues to be deoiled to the heating surfaces. P is a pipe for the introduction of heating gases. Q, R and S are passages through which the heating gases are passed and T is a pipe for the removal of said heating gases. W is a driving wheel for rotating the distributing device A. L and M are heating surfaces and N and O are scrapers connected with the aforementioned rotary device A for removing the deoiled residues.

In the operation of the process the residues to be treated are introduced in a semi-solid condition into the hollow pipe A, which is rotated by means of the wheel W and are distributed onto the surfaces L and M by means of the pipes K and J, which pipes rotate about the axis A. Heating gases are introduced by way of the pipe P and pass upwards through the passage Q and downwards through the passage R and up again through the passage S, whence they pass out through the opening T. The residues to be treated slowly run down along the surfaces L and M and are gradually deoiled by the increasing temperatures. The vapours of oil pass off through the opening G. The residues which have been deoiled are scraped off by the scrapers N and O and fall down through the opening H into a bath in which they are quenched.

The following examples will further illustrate the nature of our said invention, which however is not limited thereto. The parts are by weight.

*Example 1*

3 parts of lignite from the middle region of Germany are made into a paste with 2 parts of a heavy middle oil derived from the destructive pressure hydrogenation of coal, and passed through a high pressure reaction vessel at a temperature of 450° centigrade and under a pressure of 200 atmospheres together with hydrogen. The middle oils thus produced as well as the products of low boiling point range are carried away in the process together with the hydrogenation gases. A pasty residue remains, which contains besides oils of high boiling point range about 40 per cent of solid substances about 25 per cent of which consist of ash. The pressure on this paste is reduced to atmospheric pressure by means of a throttle valve, and the said paste is then introduced at a temperature of about 300 to 350° centigrade into a horizontal reaction vessel provided with a worm conveyor, which vessel is about 12 meters in length. In the said vessel, steam, superheated to about 500° centigrade, streams in a countercurrent to the paste, which is moved forward by means of the aforesaid conveyor and the stream thus becomes charged with oil. The temperature of this said reaction vessel is preferably differentiated in various parts. For example, in that third of the said vessel in which the residue is first treated a temperature of about 400° centigrade is maintained, in the middle of the vessel the temperature is about 450° centigrade, and in the last third where the product freed from oils is removed from the reaction vessel the temperature is about 500° centigrade. The vapors laden with oil leave the vessel and pass through several cooling systems whereby the oils are fractionally condensed. Water vapor is only condensed in the latter part of the cooling device. The gases, which may also possibly be obtained by this said process are further treated, according to a special process in order to remove the light condensible hydrocarbons contained therein. The rest of the gas mixture, consisting for the most part of methane and hydrogen, may be burned for the production of heat or worked up in order to produce hydrogen. For the treatment of 1000 kilograms of paste, about 600 to 800 kilograms of steam are employed as scavenging gases. According to the nature of the treated coal, 95 to 100 per cent of oils present in the coal, as determined by extraction with benzene are obtained.

*Example 2*

A small producer of about 1 meter in interior diameter and 3½ meter in height is provided in its upper part with a carbonizing device which may be fed from 2 worm conveyors. When setting the said producer into action, it is first charged with lignite briquettes in the ordinary manner. The removal of the gases may be carried out in such a manner that a definite proportion thereof is drawn off through the carbonizing zone and the rest outside the carbonizing zone in order to control the temperature of the various parts of the gas producer and in particular of the carbonizing device. As soon as temperature equilibrium has been set up between the producer and the carbonizing device, a paste containing about 50 per cent of solid constituents, which is derived from the hydrogenation of lignite is introduced by means of a worm conveyor and is then distributed over the whole of the cross-section of the producer by means of any suitable device. The hot gases from the producer stream away from the producer, taking along with them the oils contained in the aforesaid paste. The oils and the gases are separated from one another outside the generator, for example, by washing with oils or by electrical separating means or in any other known way. The gas which has been freed from hydrocarbons corresponds in its composition to a power gas, and may be used as such mixed with those portions of the gas which have not passed through the carbonizing device. In the producer, the residues containing oils gradually pass into zones of increasing temperature and are correspondingly freed from oil. The residues freed from oil are completely freed from gases in the lower part of the producer and are finally gasified. It may be of advantage when a less viscous paste is employed, for example, a paste containing only 30 to 40 per cent of solid components to introduce by means of the second worm conveyor aforementioned crude lignite into the corresponding shaft and to mix it therein in any suitable way with the paste. For example, by means of a distributor or a stirrer. In this way a too rapid flowing off of the paste containing oils into the hotter zones is avoided, whereby an undesired reaction furnishing objectionable products, and leading to an undue formation of gases is avoided. In this way it is possible when working with large quantities to recover 95 per cent of the oils contained in the paste, as previously determined, by means of benzene analysis.

What we claim is:

1. A process for the production of valuable hydrocarbon oils and active carbon from the pasty residues from the destructive hydrogenation with hydrogen and under pressure of high molecular hydrocarbon-containing carbonizable fuels, said residues comprising oils and minute solid carbon particles dispersed in said oils which comprises distilling said residues by treating them with superheated steam at a temperature ranging from 300 to 500° C. to drive off said oils and leave a solid residue comprising active carbon.

2. A process for the production of valuable hydrocarbon oils and active carbon from the pasty residues from the destructive hydrogenation with hydrogen and under pressure of lignite, said residues comprising oils and minute solid carbon particles dispersed in said oils which comprises distilling said residues by passing steam superheated to about 500° C. in countercurrent through said residues which are heated to from about 300 to 350° C.

MATHIAS PIER.
KARL WINKLER.
WILHELM MICHAEL.